United States Patent [19]
Domanik

[11] Patent Number: 5,798,514
[45] Date of Patent: Aug. 25, 1998

[54] CIRCULAR BAR CODE

[75] Inventor: Richard A. Domanik, Libertyville, Ill.

[73] Assignee: AccuMed Inc., Chicago, Ill.

[21] Appl. No.: 584,287

[22] Filed: Jan. 11, 1996

[51] Int. Cl.[6] .................. G06K 7/10; G06K 19/06
[52] U.S. Cl. .......................... 235/464; 235/494
[58] Field of Search ........................ 235/464, 474

[56] References Cited

U.S. PATENT DOCUMENTS

| | | | |
|---|---|---|---|
| 3,414,731 | 12/1968 | Sperry | 235/464 |
| 3,418,456 | 12/1968 | Hamisch et al. | |
| 3,600,556 | 8/1971 | Acker | 235/61.11 E |
| 3,643,068 | 2/1972 | Mohan et al. | 235/464 |
| 3,743,820 | 7/1973 | Willits et al. | 235/464 |
| 3,745,314 | 7/1973 | Mathias et al. | 235/61.11 E |
| 4,250,405 | 2/1981 | Ashcroft et al. | 235/456 |
| 4,422,105 | 12/1983 | Rodesch et al. | 358/903 |
| 4,449,042 | 5/1984 | Hampson et al. | 235/464 |
| 4,628,193 | 12/1986 | Blum | 235/375 |
| 4,858,014 | 8/1989 | Zeevi et al. | 358/217 |
| 5,032,854 | 7/1991 | Smart et al. | 354/21 |
| 5,073,587 | 12/1991 | Edwards | 524/160 |
| 5,077,806 | 12/1991 | Peters et al. | 382/8 |
| 5,087,137 | 2/1992 | Burnard et al. | 400/249 |
| 5,257,182 | 10/1993 | Luck et al. | 364/413.1 |
| 5,258,789 | 11/1993 | Labaziewicz | 354/21 |
| 5,260,556 | 11/1993 | Lake et al. | 235/494 |
| 5,333,207 | 7/1994 | Rutenberg | 382/6 |
| 5,397,709 | 3/1995 | Berndt | 436/34 |
| 5,477,012 | 12/1995 | Sekendur | 178/18 |
| 5,554,841 | 9/1996 | Kost et al. | 235/464 |
| 5,595,708 | 1/1997 | Berndt | 422/82.06 |

FOREIGN PATENT DOCUMENTS

| | | |
|---|---|---|
| 849379 | 8/1970 | Canada . |
| 63-305510 | 12/1988 | Japan . |
| WO 90/07162 | 12/1989 | WIPO . |

*Primary Examiner*—Donald T. Hajec
*Assistant Examiner*—Douglas X. Rodriguez
*Attorney, Agent, or Firm*—McDonnell Boehnen Hulbert & Berghoff

[57] ABSTRACT

A circular bar code includes first teeth directed radially inward from an outer ring and defining a radial position at which information is encoded and second teeth, tooth directed radially outward from an inner ring and opposing a corresponding one of the first teeth, wherein the information is encoded based on subdivisions of a gap between opposing first and second teeth. In one implementation, the circular bar code is printed on a disk coated with an antibiotic. The disk is used for determining the effectiveness of the antibiotic in killing bacteria, wherein the circular bar code provides identity and concentration information for the antibiotic.

20 Claims, 2 Drawing Sheets

CIRCULAR BAR CODE

FIELD OF THE INVENTION

The present invention generally relates to a machine readable code and method using the same. More particularly, the invention relates to a method and apparatus for using a circular bar code to measure a variable quantity.

BACKGROUND OF THE INVENTION

Kirby-Bauer plates are used in clinical laboratories to determine the type(s) and concentration(s) of antibiotics most effective in killing infectious bacteria. A Kirby-Bauer plate is a Petri dish, typically 100–150 mm diameter, containing a thin (typically 1–5 mm) layer of agar or growth medium on which a uniform lawn of the bacteria in question, usually isolated from a clinical specimen, is grown.

Disks or pellets containing antibiotics at various concentrations are placed on top of the growing bacteria and the plate is incubated, for example in an oven, for an appropriate period of time (hours to days). Typically, each disk is constructed of filter paper and uniformly loaded with an antibiotic of a desired concentration. At the end of the incubation period, the plate is examined. If the antibiotic in a particular disk or pellet is effective against the bacteria, there will be a clear zone around the disk/pellet in which all of the bacteria have been killed. If the antibiotic is not effective, an opaque zone, e.g., a fuzzy whitish brown layer on the agar, will remain around the disk/pellet in which the bacteria have not been killed. The size of the clear zone is an indicator of antibiotic effectiveness.

Traditionally, measurement of the clear zone size has been performed by the naked eye or using a ruler or caliper. More recently, a number of automated readers based upon machine vision technology (such as, for example, Bioscan™ or Videobac™ made by Biokit of Barcelona, Spain), have become available for carrying out clear zone size measuring. However, a problem exists in ensuring that the measurement of the appropriate disk/pellet is carried out. The disk/pellets are placed at different locations in the Petri dish on top of the bacteria manually by a technician such that the disks/pellets are in relatively uncontrolled positions. Moreover, most plates are circular which makes it very difficult to determine or control plate orientation. Both known manual and automated systems require a technician to manually assign identification/concentration information to each disk/pellet. This is both a time consuming and error prone process.

Currently, most disks and some pellets are supplied with some form of a printed textual identification code. However, attempts to read these codes have proven unsuccessful due to small character size (many disks/pellets are 6 mm in diameter), poor print quality (disk/pellet surfaces are usually rough), and random orientation resulting from manual placement. Efforts directed to bar coding have proven to be even more troublesome for substantially the same reasons. Further, linear bar codes inefficiently utilize space, so much so that the amount of information that can be applied to a disk/pellet is even less than can be applied with traditional alphanumeric codes.

Accordingly, there is a need in the art to provide a method and apparatus for automatically correlating disks/pellets of various concentrations with their clear zones to reduce the time, increase the accuracy of disk identification, and enhance the assessment of antibiotic effectiveness.

SUMMARY OF THE INVENTION

The present invention solves the aforementioned problems by providing a machine readable code for measuring a variable quantity. Several advantages are provided by the coding scheme of the present invention. For example, the code can be easily read by a machine vision system on disks having a diameter of 6 mm or less. Moreover, the coding scheme can encode a substantial amount of information and is relatively insensitive to print quality. Further, the code can be read in different orientations including face down under certain circumstances.

An illustrative circular bar code according to the present invention includes an outer ring, a plurality of first teeth, each first tooth directed radially inward from the outer ring and defining a radial position at which information is encoded, an inner ring, and a plurality of second teeth, each second tooth directed radially outward from the inner ring and opposing a corresponding one of the first teeth, wherein the information is encoded based on subdivisions of a gap between opposing first and second teeth. In an illustrative embodiment of the present invention, the circular bar code is printed on a disk coated with an antibiotic. The disk is used for determining the effectiveness of the antibiotic in killing bacteria, wherein the code provides identity and concentration information for the antibiotic. Another exemplary circular bar code according to the present invention includes a ring, and a plurality of teeth, each tooth directed radially inward from the ring and defining a radial position at which information is encoded, wherein the information is encoded based on subdivisions between the teeth and a center point of the ring.

A system for measuring a variable quantity according to the instant invention includes a vessel containing a first solution, a circular bar coded medium coated with a second solution and placed in the first solution in the vessel for a predetermined time, and a bar code reader for scanning the circular bar coded medium and radially reading the circular bar code after the expiration of the predetermined time, the circular bar code read providing information identifying the second solution. Information representative of the effect of the second solution on the first solution may be obtained simultaneously with the information contained in the circular bar code. According to a preferred embodiment, the first solution includes bacteria and the second solution is an antibiotic solution. The information obtained during reading of the code may include the identity and concentration of the antibiotic and an indication of how effective the antibiotic is in killing the bacteria.

A method for measuring a variable quantity according to the present invention includes the steps of placing a circular bar coded medium coated with a first solution in a vessel containing a second solution for a predetermined time, scanning the circular bar coded medium and radially reading the circular bar code after the expiration of the predetermined time, and comparing the circular bar code read with a plurality of predefined codes to identify the first solution and to determine the effect of the first solution on the second solution.

BRIEF DESCRIPTION OF THE DRAWINGS

A more complete appreciation of the present invention and many of the attendant advantages thereof will be readily obtained as the invention becomes better understood by reference to the following detailed description when considered in connection wcte accompanying drawing.

DETAILED DESCRIPTION OF THE PREFERRED EMBODIMENT

For the sake of convenience, the present invention will be described in terms of a machine code reader used to measure the effectiveness of an antibiotic in killing a bacteria culture in a Petri dish. However, it should be understood that the present invention may be used in numerous applications for which a code reader may be adapted.

According to the present invention, a coding system has been developed for determining the effectiveness of a particular concentration of a particular antibiotic in killing a bacteria culture in a Petri dish. Specifically, the present invention provides a circular bar code with bars configured in a radial direction where information can be coded in the length or the presence/absence of a bar rather than in its width. This differs from many conventional bar codes, such as orientation-independent target codes, in which the bars are in the form of concentric circles which are read circumferentially (rather than radially, as with the present device).

Figure 1:
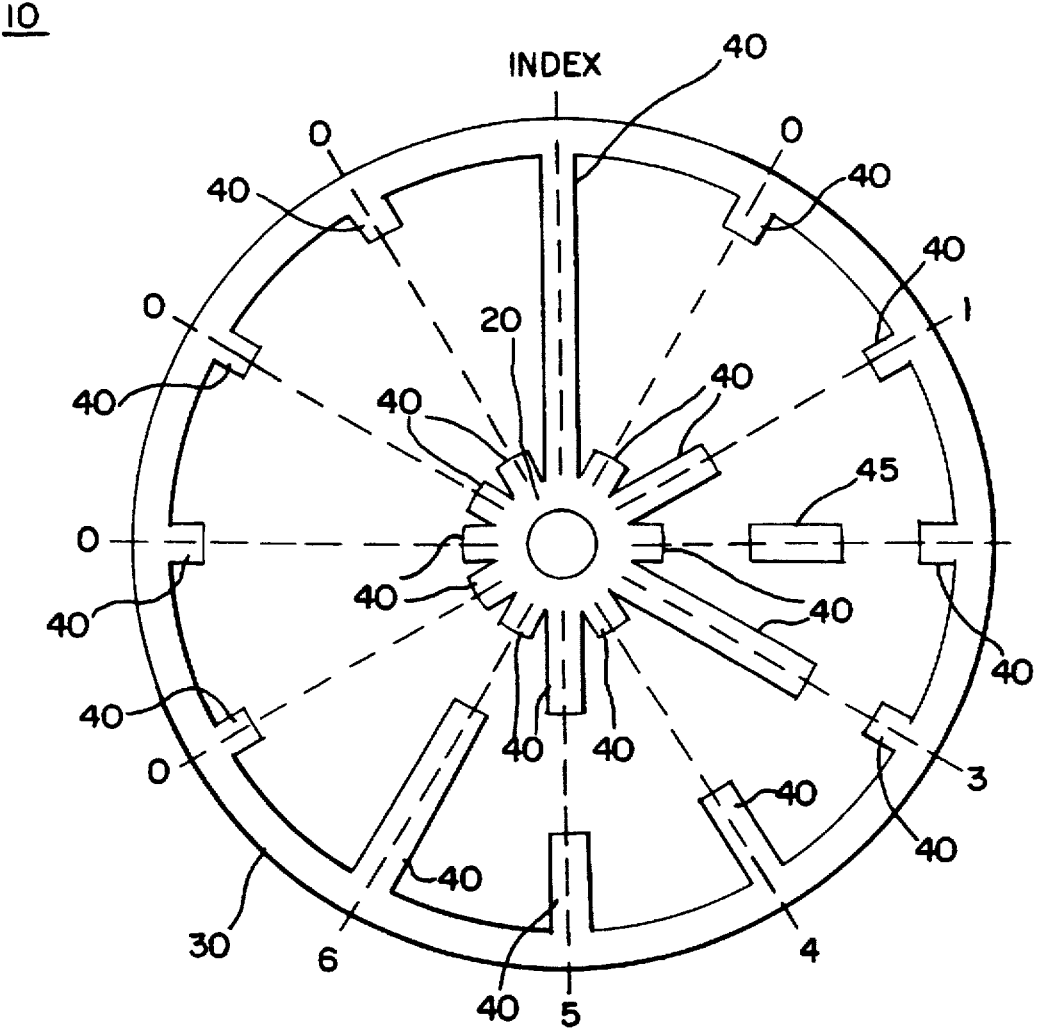
FIG. 1 shows an illustrative embodiment of a circular bar code pattern according to the present invention.
Figure 2:
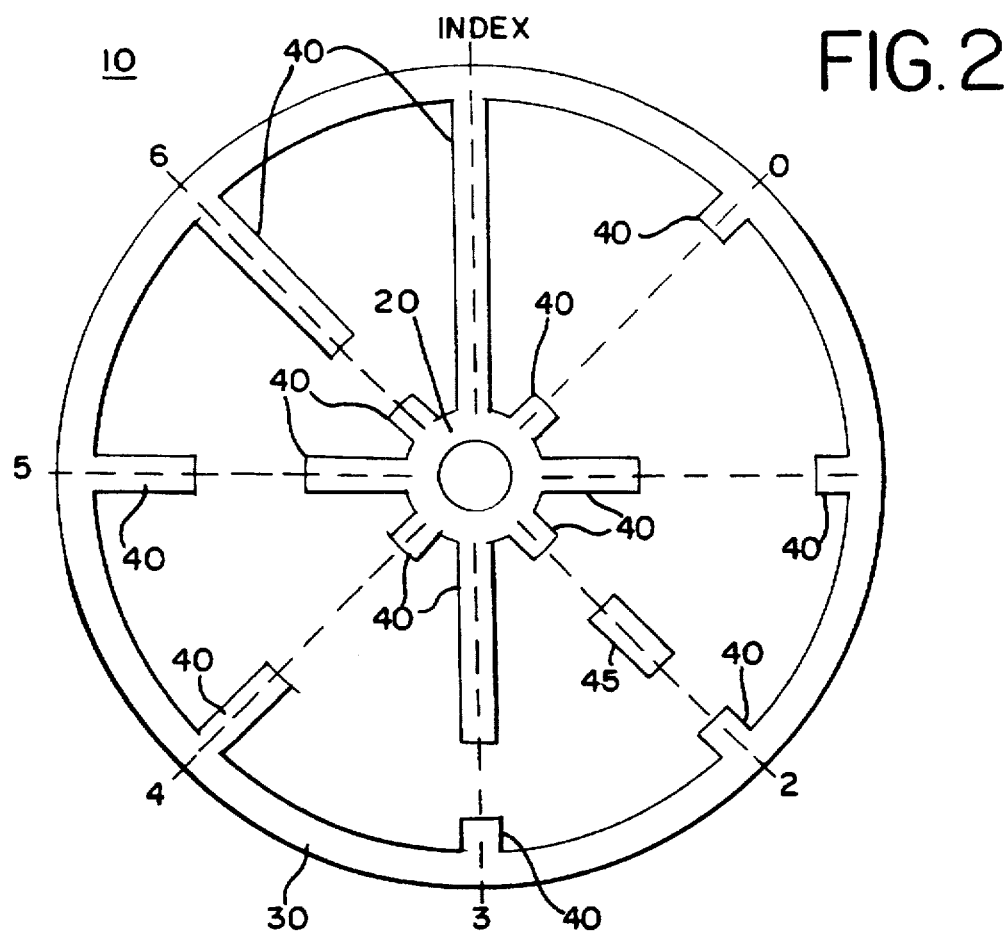
FIG. 2 shows an illustrative embodiment of another circular bar code pattern according to the present invention.

Illustrative embodiments of a disk 10 having a circular bar code according to the present invention are shown in FIGS. 1 and 2. The illustrative codes in FIGS. 1 and 2 are particularly useful for use with 12.5 mm disks. However, each of these codes can be scaled to work with all commercially available disk diameters. In a preferred, but not restrictive embodiment, a 0.5 mm line width has been found to be particularly suitable for both disk manufacture and reading. The codes of FIGS. 1 and 2 each include two concentric rings 20, 30. An inner concentric ring 20 is located at the center of the disk 10 and an outer concentric ring 30 is located at the outer periphery of the disk 10.

For ease in manufacture, the disks 10 may be printed as sheets and then punched to size. However, to ensure that each disk is punched properly so that the inner edge of the outer ring 30 and both edges of the inner ring 20 remain intact, the punching should be aligned to the printing to within less than one line width. The appropriate alignment will also provide a high contrast between the edge of the disk 10 and the surrounding bacterial lawn which simplifies zone measurement. Since identifying and locating the center of a circular object is a standard and relatively straight forward image processing operation, having three or more concentric circles in the code makes location of the center and edge of a disk 10 very accurate.

The inner edge of the outer ring 30 has a series of at least two teeth. Each tooth 40 defines a radial position at which information is encoded. Teeth are also shown around the outer edge of the inner ring 20, although not necessary for interpreting the coded pattern. The exemplary patterns in FIGS. 1 and 2 respectively contain twelve and eight teeth on both the inner ring 20 and outer ring 30, but other numbers of teeth can be used.

In the illustrative patterns of FIGS. 1 and 2, one tooth position on the outer ring 30 creates a solid bar that extends to the inner ring 20. This tooth position serves as an index mark, as identified in FIGS. 1 and 2, and denotes the position where code reading starts. The other teeth are of various lengths depending upon the information encoded. For example, the smallest teeth have lengths equal to the line width although this is not critical. The amount of information that can be encoded at any tooth position depends upon how the gap between a pair of opposing teeth 40 is subdivided. FIGS. 1 and 2 show five subdivisions, three which encode information (e.g., the dark subdivisions) and two which serve as separators (e.g., the light subdivisions). The separators are not really necessary, but help to improve decoding reliability.

When there is no inner ring, and accordingly no pairs of inner teeth, the amount of information that can be encoded is determined by the distance from the teeth to the center, i.e., the distance to the center from the outer circles, which is calculated by standard methods. The outer teeth are then projected to the center point.

The illustrative arrangements in FIGS. 1 and 2 provide a total of seven possible tooth designs: no tooth extension; outer tooth extension by one or two units; inner tooth extension by one or two units; both teeth extended by one unit; and an isolated segment 45 floating between two teeth 40. The eighth possible tooth design is the solid bar joining two opposed teeth which is reserved for the previously described index mark. Accordingly, one radial position in the patterns of FIGS. 1 and 2 can encode seven states. The pattern in FIG. 1 can encode $7^{11}$ ($1.98 * 10^9$) different coded states plus the index mark and the pattern in FIG. 2 can encode $7^7$ or 823,500 different coded states plus the index mark. By changing the number of radial positions and subdivisions, other numbers of possible states can be obtained.

Figure 3:
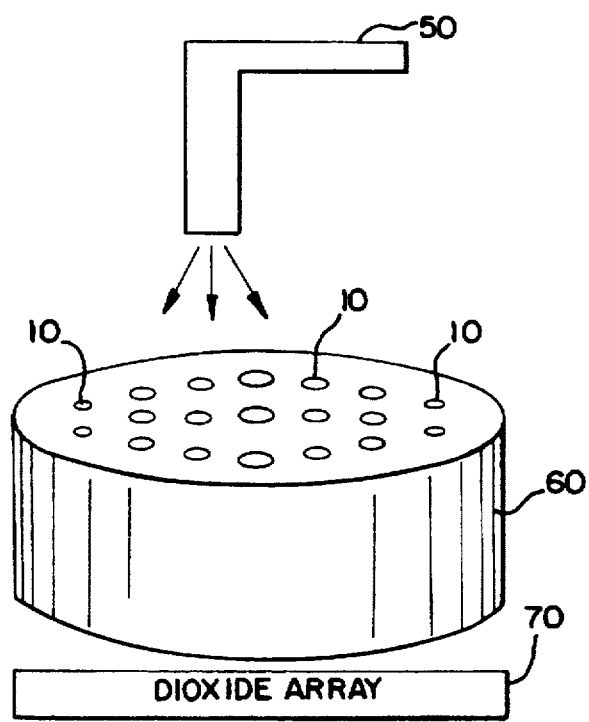
FIG. 3 shows a system in which coded disks are employed according to the present invention.

Code reading is performed radially in circular zones concentric with the previously determined center of the pattern. According to an illustrative embodiment shown in FIG. 3, a light source 50 generates light which impinges on the disks 10 in the Petri dish 60. A linear diode array 70 responsive to light emanating from light source 50 detects the light which has been refracted or reflected by the code on the disks 10. The light source 50 scans the code on the disk radially. Other types of scan readers known in the art including, but not limited to, spin readers, image processors, and other contact type readers, may be utilized to read the encoded disks. Also, different types of colors and lights based on different types of reflectances or refractances can be utilized including those outside the visible spectrum.

For the code patterns in FIGS. 1 and 2, four zones of scanning are required. One scanning zone is located within each of a one unit extension of either an inner or outer tooth, a two unit extension/isolated center mark; and the outer teeth. The outer tooth scanning zone defines the radial positions at which valid information can be obtained while the remaining scanning zones carry the information. A mark appearing in all four zones denotes the index position at the start of the code. By convention, the codes are read in a clockwise direction from the index. Reducing the code density to six states per radial position generates a self clocking code that eliminates the need to read the outer teeth since there will be at least one mark at each radial position.

According to an illustrative scanning operation according to the present invention, the following steps are carried out: 1) acquire an image of the dish and its contents (e.g., bacterial lawn, inhibition zones, antibiotic disks with radial bar codes) as a rectilinear array of pixels; 2) optionally enhance the image by, for example, creating a binary (two intensity level) representation of the initial image, edge enhancement, etc. which can facilitate subsequent analysis using well known methods; 3) determine the locations of the circular image features corresponding to the interior boundary of the dish, the inhibition zones, and the inner and outer rings of the antibiotic disks by standard methods such as correlation of the image with matched filters; 4) compute the locations of each circular feature found in step 3 using basic trigonometry or another known method; 5) convert, for convenience and improved computational efficiency, the circular features corresponding to antibiotic disks and inhibition zones from rectangular to polar coordinates; 6) determine code segment locations by examining each circular feature from step 5 (or 4) along multiple radii for antibiotic disks, the number of radial positions being larger than the number of radial positions used in the code; and 7) decode the code segment locations determined in step 6 by a lookup table or another known method to identify the particular antibiotic and antibiotic concentration associated with the disk being examined.

Thus, the resulting code number can be decoded into antibiotic identification and concentration information and other information by automatically comparing the detected code with a set of defined code patterns in a lookup table. Therefore, each disk 10 can use the radial bar code to combine information relating to identity and concentration of the antibiotic as well as to determine the effectiveness of the antibiotic in breaking down the bacteria. By providing numerous codes for encoding different types of information, many disks (e.g., six to twelve) may be placed in the Petri dish 60 to determine the effectiveness of each antibiotic solution on each disk 10 without any difficulty in identifying which disk corresponds to which antibiotic solution. The number of disks used depends, of course, on the plate and disk size as well as the acceptable overlap between inhibition times.

Several factors determine the code segment locations in step 6. Intensity changes along each radial line correspond to the edges of the code features traversed. The radial line along which no transitions occur between the inner and outer code rings identifies the index mark. The locations of the other coding locations can be estimated from this information and confirmed by radial scans. The locations of transitions along these subsequent scans identify whether the position is occupied by a tooth spined to the inner or outer ring, a code segment joined by the inner or outer ring, or an isolated code segment. For inhibition zones, radii are extended beyond the boundary of the antibiotic disk until a transition indicating the edge of the inhibition zone is observed. If no zone edge is observed at any radial position, no inhibition is assumed to have occurred and the antibiotic is determined to be ineffective against the bacteria.

Since the number of code states available can be far larger than the number of possible antibiotic type/concentration combinations used in a typical laboratory, disks not containing an antibiotic, but coded with otherwise unused code states, can be used to unambiguously identify the particular specimen in a machine readable manner. In current practice, the identification of the specimen is written on the outside of the dish or a label, e.g., written, bar code, is applied to the outside of the dish. This information must be acquired and correlated with the test results in a separate step. The well documented potential for error when the specimen identification and test results are separately determined and manually correlated can be eliminated by applying a radially encoded identification disk to the surface of the growth medium in the manner described above.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

We claim:

1. A circular bar code comprising:

an outer ring;

a plurality of first teeth, each first tooth directed radially inward from said outer ring and defining a radial position at which information is encoded;

an inner ring; and a plurality of second teeth, each second tooth directed radially outward from said inner ring and opposing a corresponding one of said first teeth, wherein the information is encoded based on subdivisions of a gap between opposing first and second teeth.

2. The circular bar code according to claim 1, wherein a solid bar joining one of said first teeth and a corresponding one of said second teeth serves as an index mark.

3. The circular bar code according to claim 1, wherein the length of a corresponding one of said first and second teeth combine to form a state of an element in a code pattern.

4. The circular bar code according to claim 1, wherein the presence or absence of a bar between a corresponding one of said first and second teeth combine to form a state of an element in a code pattern.

5. The circular bar code according to claim 1, wherein an isolated mark between opposing first and second teeth forms a state of an element in a code pattern.

6. The circular bar code according to claim 1, wherein the circular bar code is read radially.

7. The circular bar code according to claim 1, wherein the circular bar code is printed on a disk coated with ad antibiotic, the disk used for determining the effectiveness of the antibiotic in killing bacteria, wherein the code provides identity and concentration information for the antibiotic.

8. The circular bar code according to claim 1, wherein tooth designs for opposing first and second teeth include no tooth extension, first tooth extension by at least one unit, and second tooth extension by at least one unit.

9. The circular bar code according to claim 8, wherein tooth designs of opposing first and second teeth further include first and second teeth extension by at least one unit.

10. The circular bar code according to claim 9, wherein tooth designs of opposing first and second teeth further include an isolated segment floating between first and second teeth and a solid bar joining first and second teeth.

11. A circular bar code comprising:

a ring defining a perimeter a center point and a plurality of radial subdivisions between said perimeter and said center point; and a plurality of radially directed bars disposed between said perimeter and said center point, each bar defining a length and encoding information based on the radial subdivisions through which the bar extends said radical subdivisions extending said perimeter and said center point.

12. The circular bar code according to claim 11, wherein the circular bar code is read radially.

13. The circular bar code according to claim 11, wherein the circular bar code is printed on a disk coated with an antibiotic, the disk used for determining the effectiveness of the antibiotic in killing bacteria, wherein the code provides identity and concentration information for the antibiotic.

14. A circular bar code comprising:

a ring; and a plurality of teeth, each tooth directed radially inward from said ring and defining a radial position at which information is encoded, wherein the information is encoded based on subdivisions between said teeth and a center point of said ring, and wherein a solid bar joining one of said teeth and the center point of said ring serves as an index point.

15. A circular bar code comprising:

a ring; and a plurality of teeth, each tooth directed radially inward from said ring and defining a radial position at which information is encoded, wherein the information is encoded based on subdivisions between said teeth and a center point of said ring, and wherein the length of a corresponding one of said teeth forms a state of an element in a code pattern.

16. A circular bar code comprising:

a ring; and a plurality of teeth, each tooth directed radially inward from said ring and defining a radial position at which information is encoded, wherein the information is encoded based on subdivisions between said teeth and a center point of said ring, and wherein the presence or absence of a bar between one of said teeth and the center point of said ring combine to form a state of an element in a code pattern.

17. A circular bar code comprising:

a ring; and a plurality of teeth, each tooth directed radially inward from said ring and defining a radial position at which information is encoded, wherein the information is encoded based on subdivisions between said teeth and a center point of said ring, and wherein an isolated mark between one of said teeth and the center point of said ring forms a state of an element in a code pattern.

18. A circular bar code comprising:

a rind; and a plurality of teeth, each tooth directed radially inward from said ring and defining a radial position at which information is encoded, wherein the information is encoded based on subdivisions between said teeth and a center point of said ring, and wherein tooth designs for said teeth include no tooth extension and tooth extension by at least one unit.

19. The circular bar code according to claim 18, wherein tooth designs for said teeth further include a tooth extending from the center point of said ring by at least one unit.

20. The circular bar code according to claim 19, wherein tooth designs of said teeth further include an isolated segment floating between one of said teeth and the center point of said ring, and a solid bar joining one of said teeth and the center point of said ring.

* * * * *